(12) United States Patent
Ikeda et al.

(10) Patent No.: US 9,402,030 B2
(45) Date of Patent: Jul. 26, 2016

(54) INFORMATION PROCESSING APPARATUS AND STORAGE MEDIUM FOR DISPLAYING IMAGE ON A DISPLAY REGION

(71) Applicant: SONY CORPORATION, Tokyo (JP)

(72) Inventors: Tetsuo Ikeda, Tokyo (JP); Tsubasa Tsukahara, Tokyo (JP); Keishi Tsuchiya, Tokyo (JP); Daisuke Nagano, Kanagawa (JP); Daisuke Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 16 days.

(21) Appl. No.: 14/322,396

(22) Filed: Jul. 2, 2014

(65) Prior Publication Data

US 2015/0015761 A1    Jan. 15, 2015

(30) Foreign Application Priority Data

Jul. 12, 2013  (JP) ................. 2013-146657

(51) Int. Cl.
| H04N 5/222 | (2006.01) |
| H04N 5/232 | (2006.01) |
| G06F 3/0487 | (2013.01) |
| G06F 1/16 | (2006.01) |
| G06F 1/32 | (2006.01) |
| G06Q 30/02 | (2012.01) |

(52) U.S. Cl.
CPC .......... *H04N 5/23293* (2013.01); *G06F 1/1626* (2013.01); *G06F 1/1643* (2013.01); *G06F 1/1686* (2013.01); *G06F 1/1694* (2013.01); *G06F 1/3265* (2013.01); *G06F 3/0487* (2013.01); *G06Q 30/0207* (2013.01); *G06Q 30/0241* (2013.01); *Y02B 60/1242* (2013.01)

(58) Field of Classification Search
CPC ...................................................... G06F 3/048
See application file for complete search history.

(56) References Cited

U.S. PATENT DOCUMENTS

| 7,710,390 B2 * | 5/2010 | Tokkonen | G06F 3/0488 178/18.01 |
| 2005/0248677 A1 * | 11/2005 | Katagiri | H04N 5/2354 348/333.02 |
| 2011/0075016 A1 * | 3/2011 | Shimizu | H04N 5/2171 348/345 |
| 2011/0202835 A1 * | 8/2011 | Jakobsson | G06F 3/0481 715/702 |
| 2012/0032979 A1 * | 2/2012 | Blow | G06F 1/1626 345/647 |
| 2012/0069232 A1 * | 3/2012 | Chui | G02B 26/001 348/333.01 |
| 2012/0212467 A1 * | 8/2012 | Kohtoku | G02F 1/1354 345/207 |
| 2013/0328917 A1 * | 12/2013 | Zambetti | G06F 1/1626 345/620 |
| 2014/0092043 A1 * | 4/2014 | de Leon | G06F 3/0488 345/173 |
| 2014/0118577 A1 * | 5/2014 | Masuda | H04N 5/232 348/240.2 |

FOREIGN PATENT DOCUMENTS

JP    H09-200311 A    7/1997

* cited by examiner

*Primary Examiner* — Gary C Vieaux
(74) *Attorney, Agent, or Firm* — Chip Law Group

(57) ABSTRACT

There is provided a display control device including a recognition unit configured to recognize a display region in a display unit which is visible from outside, an image generation unit configured to generate an image to be displayed in accordance with the display region recognized by the recognition unit, and a display control unit configured to control the display unit to display, on the display region, the image generated by the image generation unit.

8 Claims, 17 Drawing Sheets

FIG. 1
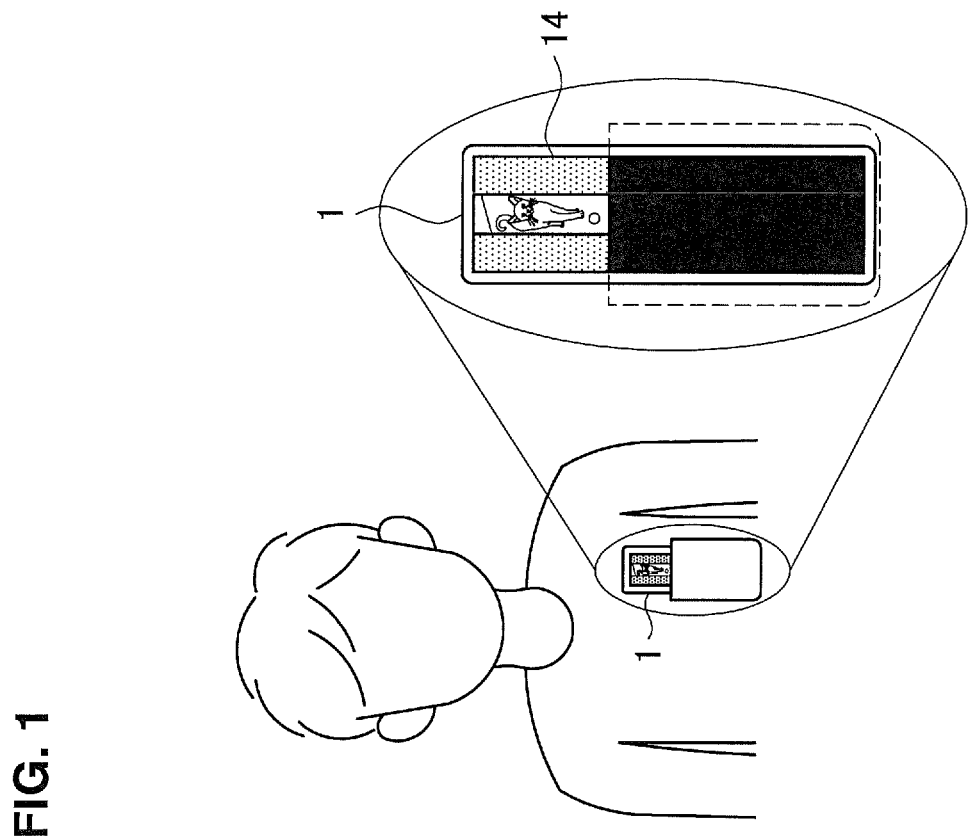
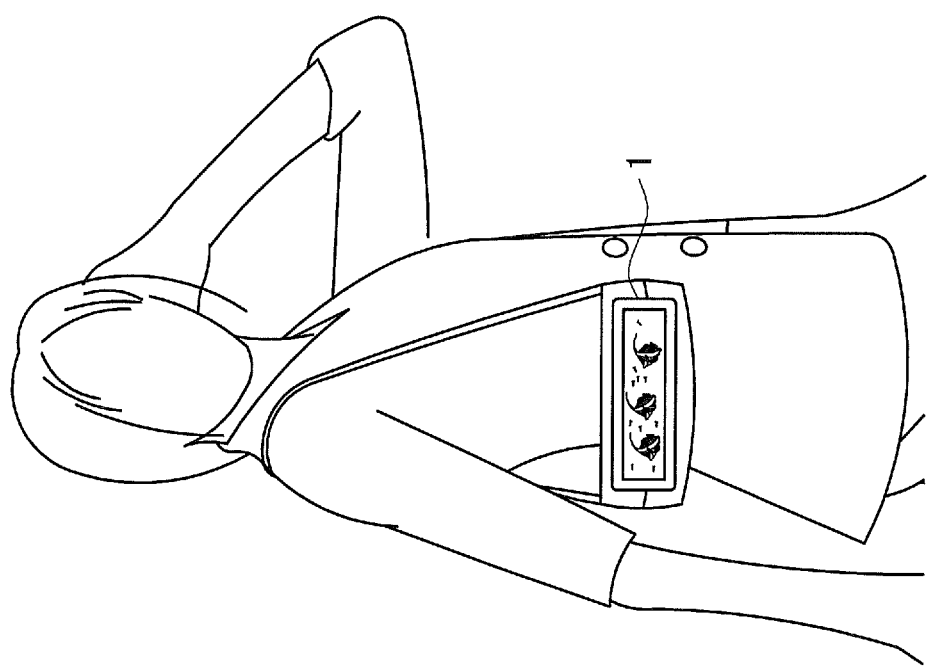

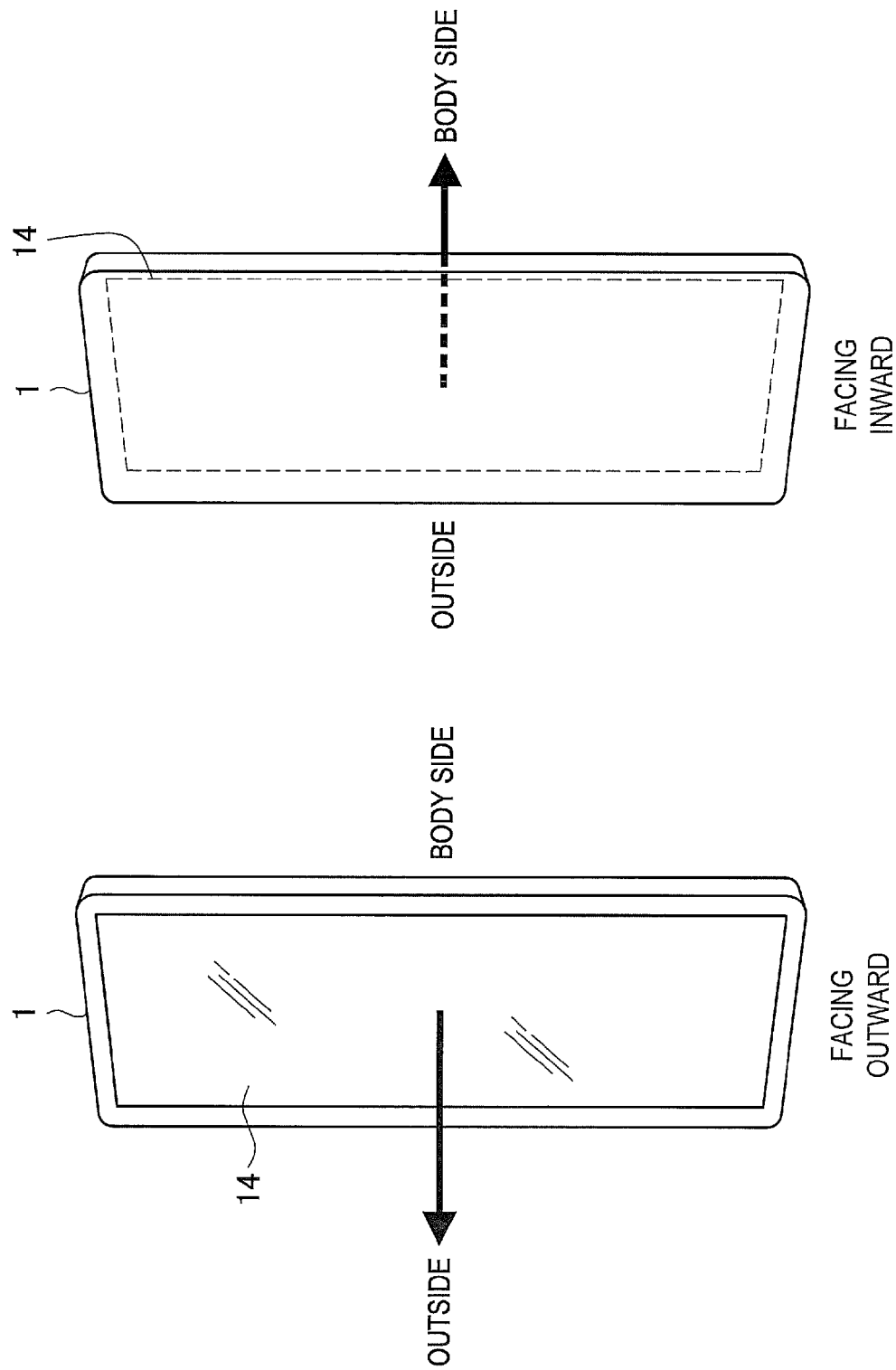

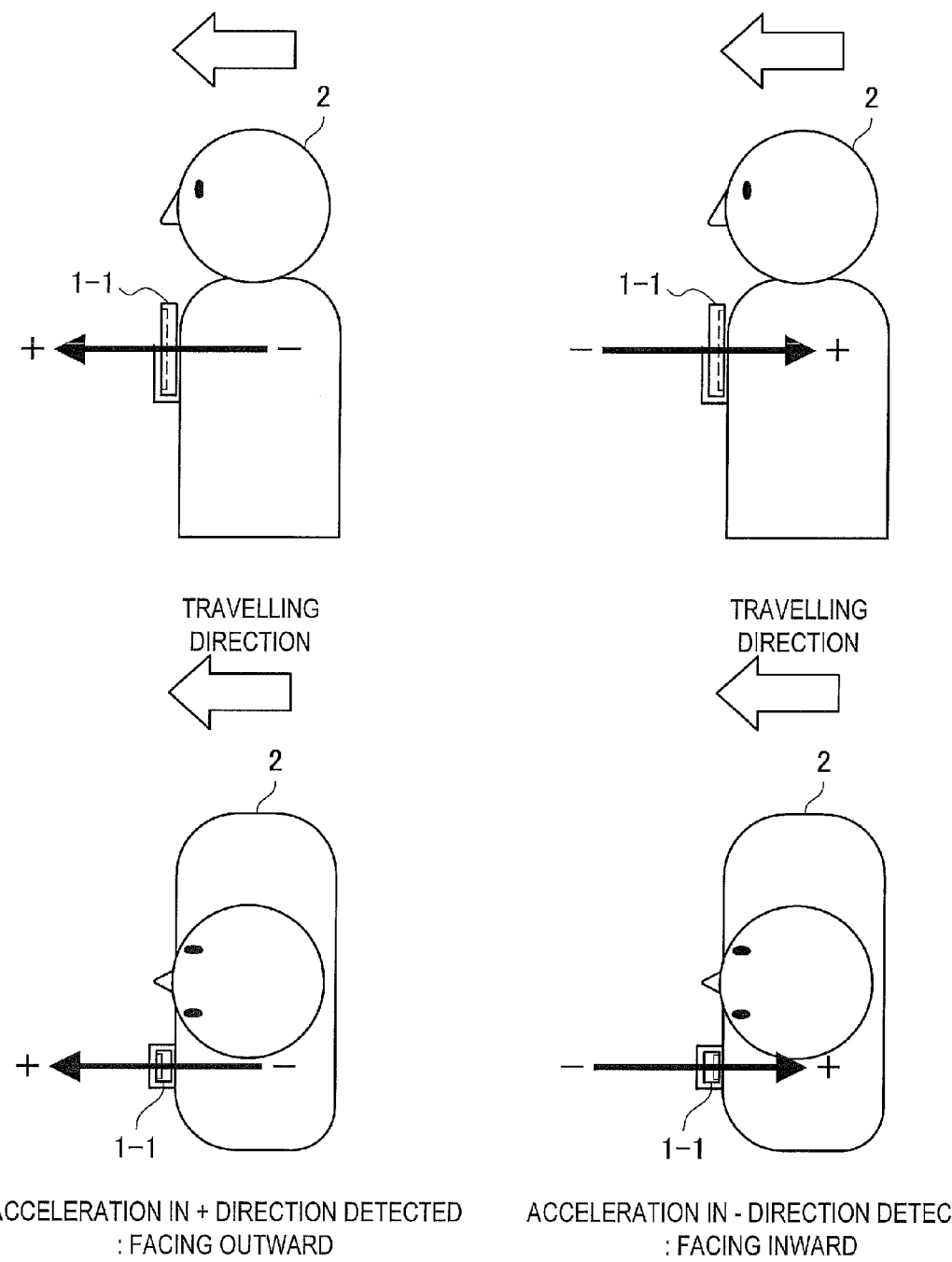

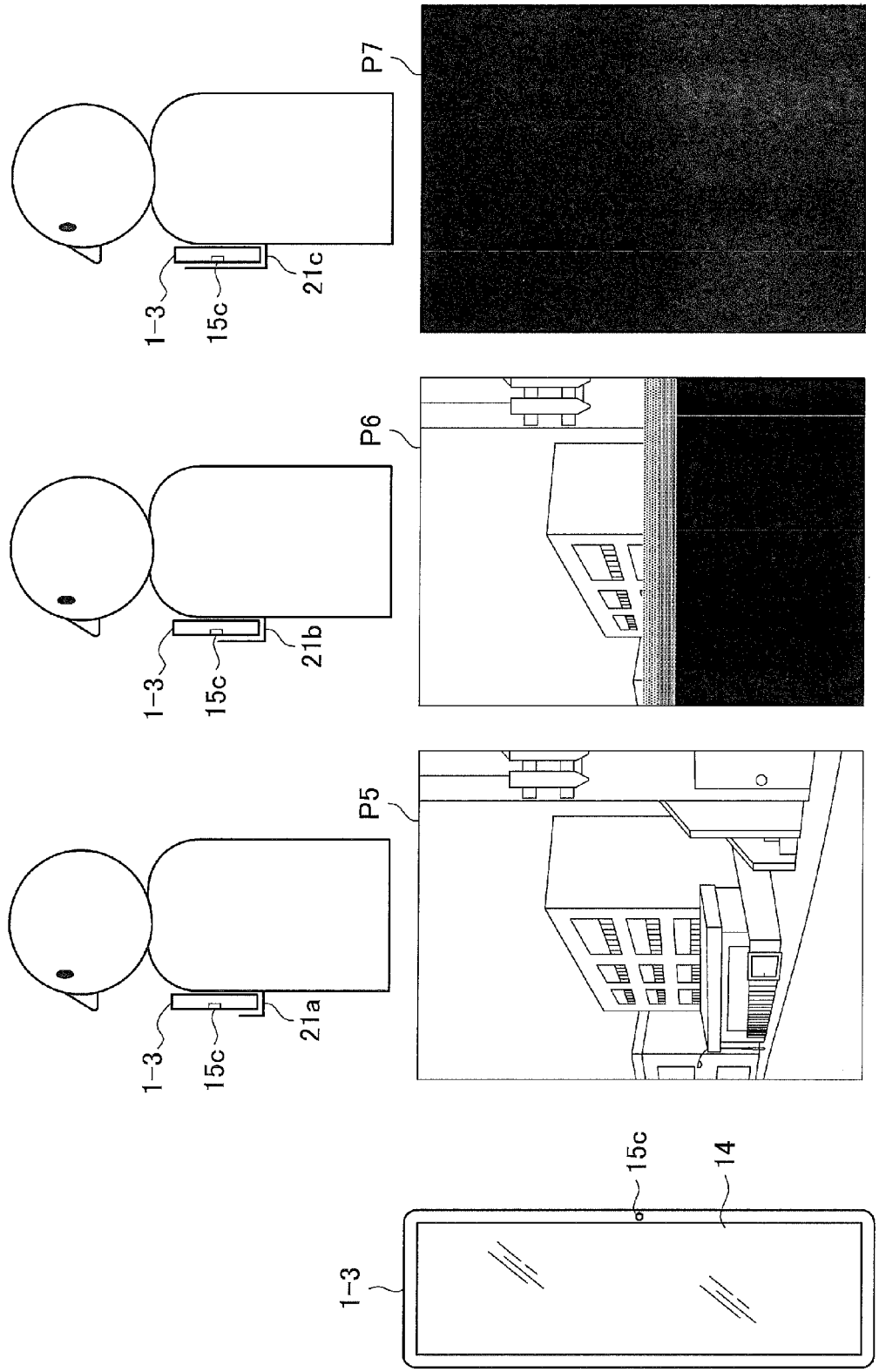

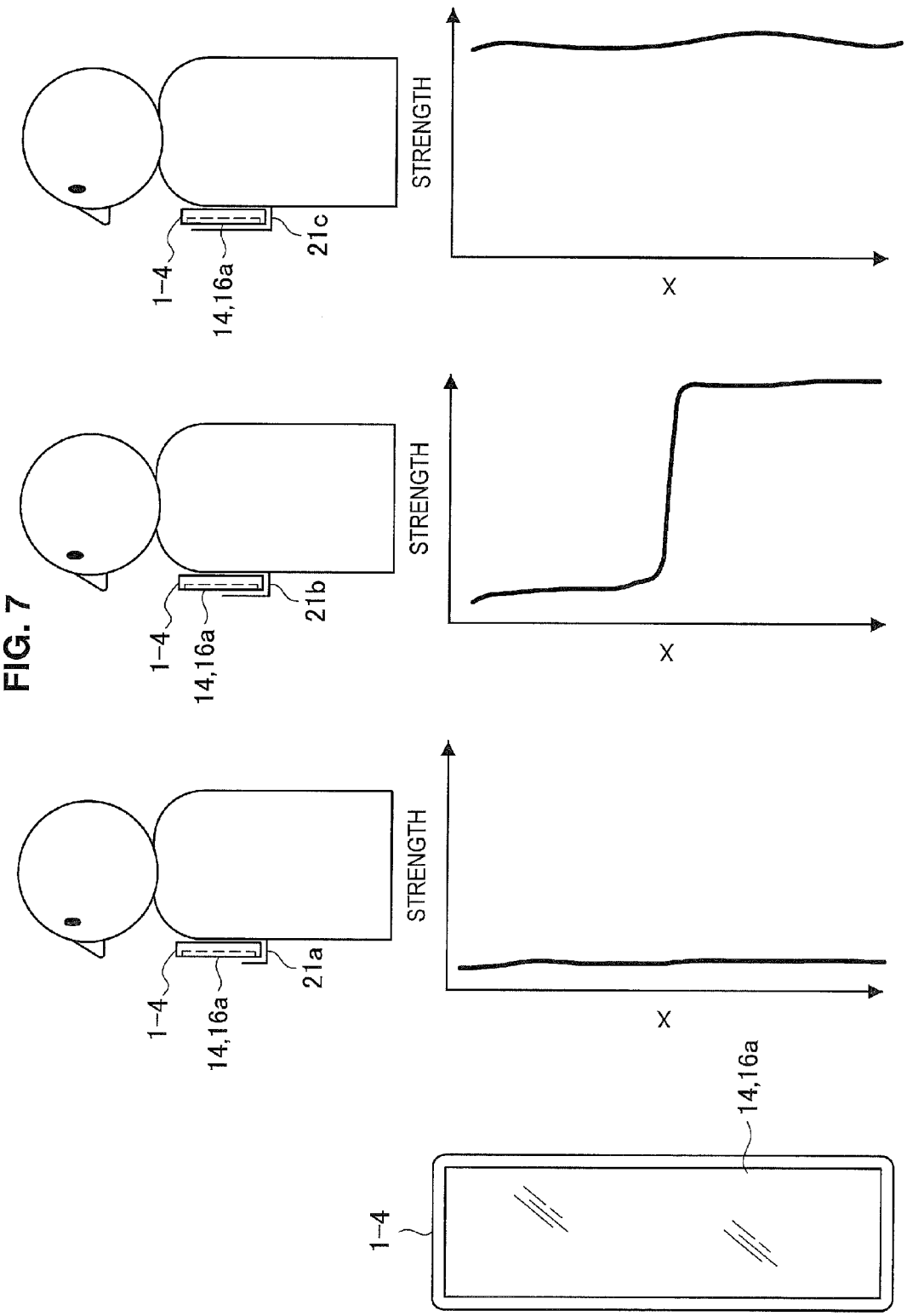

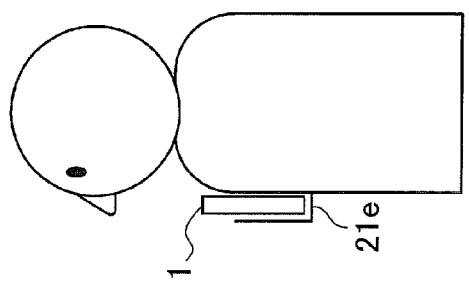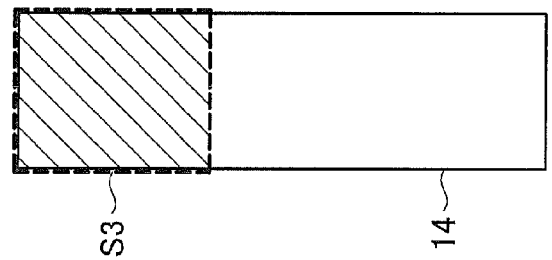
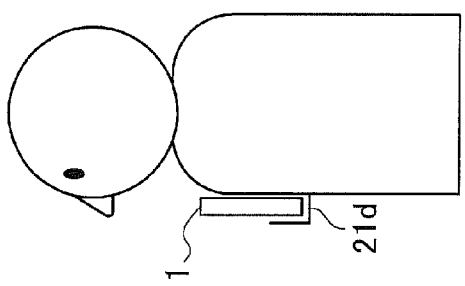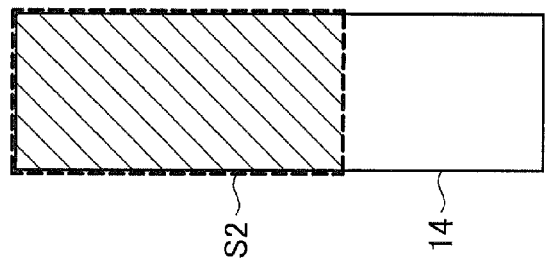
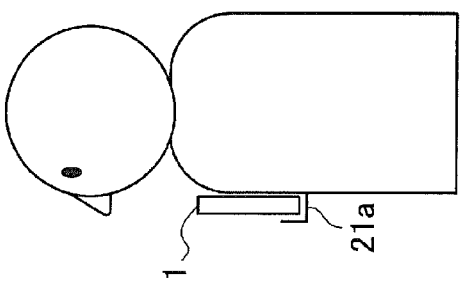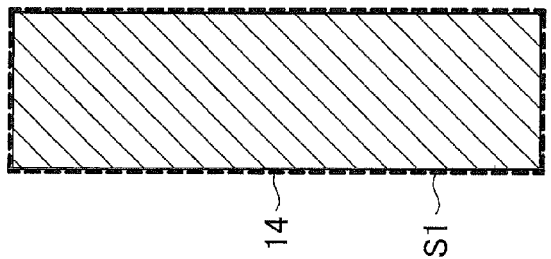
FIG. 8

FIG. 11
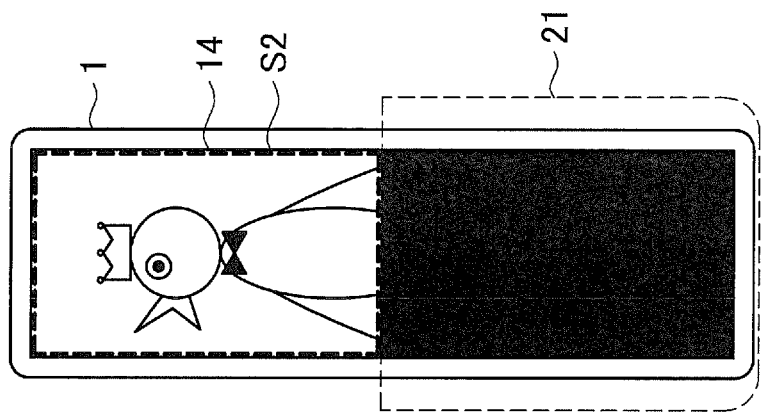
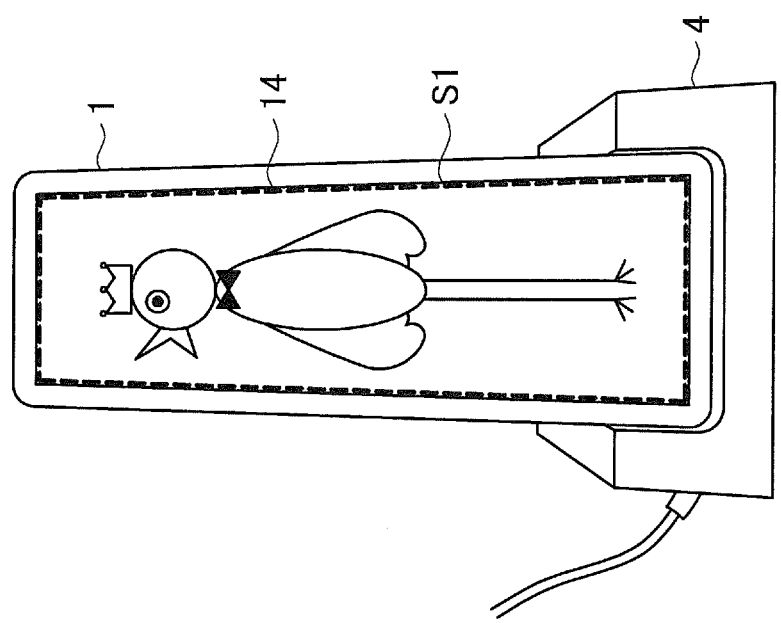

INFORMATION PROCESSING APPARATUS AND STORAGE MEDIUM FOR DISPLAYING IMAGE ON A DISPLAY REGION

CROSS REFERENCE TO RELATED APPLICATIONS

This application claims the benefit of Japanese Priority Patent Application JP 2013-146657 filed Jul. 12, 2013, the entire contents of which are incorporated herein by reference.

BACKGROUND

The present disclosure relates to an information processing apparatus and a storage medium.

In the past, providing mobile phone terminals with a foldable structure has improved the robustness of the terminals. For example, JP H9-200311A proposes a foldable phone that, when folded, exhibits superior robustness and portability, by providing a shape that allows a transmitter and a receiver to fit each other when the phone is folded in two.

SUMMARY

In recent years, however, various techniques which have been applied to the aforementioned foldable mobile phone terminals are gradually becoming unusable due to widespread use of non-foldable mobile terminals such as represented by smart phones and tablet terminals.

Particularly, non-foldable mobile terminals are characteristic in that the display screen is typically exposed, unlike foldable mobile terminals. Therefore, although the typically-exposed display screen may be effectively used as long as it is possible to continuously show the display screen to the outside while carrying the terminal, there has not been proposed any technique related to effectively using such a display screen in the past.

In addition, since the display screen is usually turned OFF when a mobile terminal is carried with the lock function being turned ON to prevent malfunction, the effective use thereof, such as continuously showing the display screen to the outside while carrying the terminal, has been difficult.

Although it is necessary to turn OFF the lock function in order to continuously show the display screen to the outside while carrying the terminal, the following matter arises in such a case.

Specifically, the entire screen is typically a drawing target even when only a part of the display screen is visible from the outside, or, when a part of the display screen is hidden by a pocket or the like, a part of information presented on the display screen may also be hidden, resulting in an incomplete presentation of the information. In addition, since information is presented even when the display screen is facing inward and invisible from the outside, there has also been a matter of wasted power consumption.

Therefore, the present disclosure proposes an information processing apparatus and a storage medium capable of presenting information to the outside more effectively, by performing display control in accordance with a display region which is visible from the outside.

According to an embodiment of the present disclosure, there is provided a display control device including a recognition unit configured to recognize a display region in a display unit which is visible from outside, an image generation unit configured to generate an image to be displayed in accordance with the display region recognized by the recognition unit, and a display control unit configured to control the display unit to display, on the display region, the image generated by the image generation unit.

According to an embodiment of the present disclosure, there is provided a non-transitory computer-readable storage medium having a program stored therein, the program causing a computer to function as a recognition unit configured to recognize a display region in a display unit which is visible from outside, an image generation unit configured to generate an image to be displayed in accordance with the display region recognized by the recognition unit, and a display control unit configured to control the display unit to display, on the display region, the image generated by the image generation unit.

As described above, according to one or more of embodiments of the present disclosure, it becomes possible to present information to the outside more effectively by performing display control in accordance with the display region which is visible from the outside.

BRIEF DESCRIPTION OF THE DRAWINGS

FIG. 1 is an explanatory diagram illustrating an outline of an information processing apparatus according to an embodiment of the present disclosure;

FIG. 3 is an explanatory diagram of a definition of orientation of the information processing apparatus according to the present embodiment;

FIG. 4B is an explanatory diagram of a process of recognizing the orientation of the information processing apparatus using a motion sensor;

FIG. 6 is an explanatory diagram of a recognition process of a display region of each information processing apparatus when the information processing apparatuses are put in pockets of different depths;

FIG. 7 is an explanatory diagram of a recognition process of the display region of each information processing apparatus when the information processing apparatuses are put in pockets of different depths;

FIG. 8 is a schematic explanatory diagram of display control in accordance with a display region which is visible from the outside;

FIG. 11 is an explanatory diagram of an exemplary display according to an application which displays an agent such as a character;

DETAILED DESCRIPTION OF THE EMBODIMENT(S)

Figure 2:
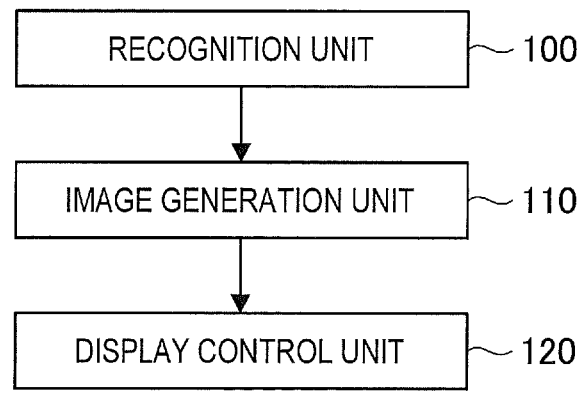
FIG. 2 is a block diagram illustrating the functional configuration of the information processing apparatus according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, explanation will be given in the following sequence.
1. Outline of the information processing apparatus according to an embodiment of the present disclosure
2. Functional configurations
  2-1. Respective configurations
  2-2. Recognition method
  2-3. Exemplary display
3. Operation processing
4. Hardware configuration
5. Conclusion <<1. Outline of the Information Processing Apparatus According to an Embodiment of the Present Disclosure>>

First, the outline of the information processing apparatus according to an embodiment of the present disclosure will be described, referring to FIG. 1. As illustrated in FIG. 1, an information processing apparatus 1 according to the present embodiment has a display unit 14 provided at one side thereof, which may be put in a user's bag or pocket in a manner facing outward so that a display unit 14 is visible from the outside. The aspect ratio of the display unit 14 may be 3:1, for example, without particularly being limited thereto. In addition, the display unit 14 may have a touch sensor stacked thereon, so that user operation on the display screen is detected by the touch sensor. In addition, the information processing apparatus 1 according to the present embodiment may be a mobile terminal such as a tablet terminal and a smart phone.

As illustrated in FIG. 1, there may be conceived a new method of using the information processing apparatus 1 such as presenting information to the people around, when the information processing apparatus 1 is put in a user's bag or pocket facing outward so that the display unit 14 is visible from the outside. For example, there may be conceived, for example, a business model of receiving rewards such as privileges or points in return for presenting an advertisement to the people around, or a usage as a part of the fashion by wearing the information processing apparatus 1 with a logo or character of a favorite brand being presented thereon.

Here, the matter of wasting power consumption may arise because the entire screen is typically a drawing target even when only a part of the display screen is visible from the outside, or information is presented even when the display screen is facing inward and invisible from the outside. In addition, there may also arise a matter such that, when a part of the display screen is hidden by a pocket or the like, a part of information presented on the display screen may also be hidden, resulting in an incomplete presentation of the information.

Therefore the present embodiment proposes the information processing apparatus 1 capable of presenting information to the outside more effectively, by performing display control in accordance with a display region which is visible from the outside.

In an example illustrated in FIG. 1, for example, the information processing apparatus 1 put in a user's chest pocket recognizes a display region which is visible from the outside, i.e., a display region exposed from the chest pocket, and performs control to display a reduced image only in the visible display region. Accordingly, the information being presented is entirely visible from the outside, whereby it is possible to realize information presentation in a complete state. In addition, wasting power consumption may be prevented by turning OFF the display of the part hidden by the chest pocket (partial light off) or providing a monochrome presentation.

The outline of the information processing apparatus 1 according to an embodiment of the present disclosure has thus been described above. Subsequently, a configuration and operation processing of the information processing apparatus 1 according to the present disclosure will be sequentially described.

<<2. Functional Configuration>>
<2-1. Respective Configurations>

FIG. 2 is a block diagram illustrating the functional configuration of the information processing apparatus 1 according to the present embodiment. As illustrated in FIG. 2, the information processing apparatus 1 functions as a recognition unit 100, an image generation unit 110, and a display control unit 120.

(Recognition Unit)

The recognition unit 100 recognizes a display region in the display unit 14, which is visible from the outside. For example, the recognition unit 100 is capable of recognizing the display region in the display unit 14 which is visible from the outside, according to an image captured by a camera (imaging unit) provided in the information processing apparatus 1, or information from a touch sensor provided in the display unit 14.

In addition, the recognition unit 100 is capable of recognizing the orientation of the information processing apparatus 1. Specifically, the recognition unit 100 recognizes whether the display unit 14 provided in the information processing apparatus 1 is facing the outside (facing outward) to be visible from the outside, or facing the inside (facing inward), which is invisible from the outside (apparatus-receiving side). The recognition unit 100 may be configured to perform, upon recognizing that the information processing apparatus 1 is facing outward, a process of recognizing the display region in the display unit 14 which is visible from the outside.

Various recognition methods by the aforementioned recognition unit 100 will be described in detail in the following "2-2. Recognition method".

(Image Generation Unit)

The image generation unit 110 generates an image to be displayed, in accordance with the display region recognized by the recognition unit 100. For example, the image generation unit 110 may perform an enlargement or reduction process so as to fit the size of the display region recognized by the recognition unit 100 to generate the image to be displayed. In addition, the image generation unit 110 may generate an image in accordance with the priority order of information among the images to be displayed, so as to fit the size of the display region recognized by the recognition unit 100. In this occasion, the image generation unit 110 may generate an image arranged so that a piece of information high in the priority order is located at the center of the display region, or may generate an image in which a plurality of pieces of information high in the priority order is aggregated.

An exemplary display of an image thus generated by the image generation unit 110 will be described in detail in the following "2-3. Exemplary display".

(Display Control Unit)

The display control unit 120 performs control to display the image generated by the image generation unit 110 in the display region recognized by the recognition unit 100. In this occasion, the display control unit 120 may control to display the image generated by the image generation unit 110 only in the display region, to turn OFF display in any region other than the display region recognized in the display unit 14, or to perform monochrome presentation.

The functional configuration of the information processing apparatus 1 according to the present embodiment has thus been described above. Subsequently, a specific recognition method by the recognition unit 100 included in the functional configuration of the information processing apparatus 1, and an exemplary display of the image generated by the image generation unit 110 will be sequentially described.

<2-2. Recognition Method>

(2-2-1. Orientation Recognition)

The recognition unit 100 is capable of recognizing whether the information processing apparatus 1 is facing outward or inward as described above. Here, the definition of facing outward and facing inward for the information processing apparatus 1 in the present specification will be described, referring to FIG. 3.

FIG. 3 is an explanatory diagram of a definition of the orientation of the information processing apparatus 1 according to the present embodiment. In the present specification, as illustrated in FIG. 3, a state that the side on which the display unit 14 of the information processing apparatus 1 is provided is facing the outside is referred to as facing outward, whereas a state that the side on which the display unit 14 is provided is facing an object side (apparatus receiving side) such as a person's body on which the information processing apparatus 1 is put in, is referred to as facing inward.

An exemplary method of recognizing the orientation of such an information processing apparatus 1 will be described in detail, referring to FIGS. 4 to 5 in the following.

(Recognition Method Using a Motion Sensor)

Figure 4A:
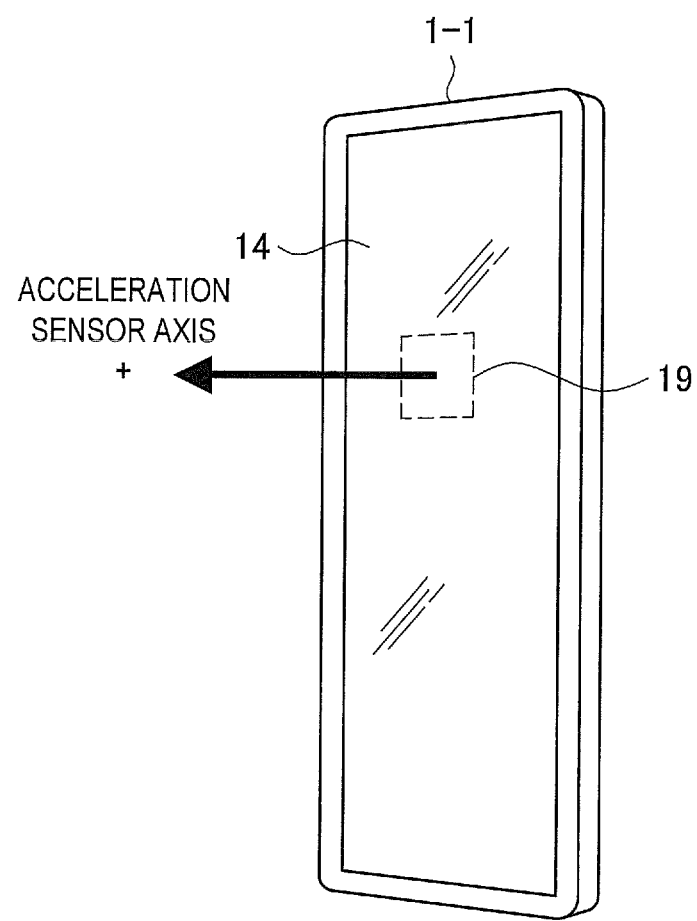
FIG. 4A is an explanatory diagram of a process of recognizing the orientation of the information processing apparatus using a motion sensor.

FIGS. 4A and 4B are explanatory diagrams of a process of recognizing the orientation of the information processing apparatus 1 using a motion sensor. In this example, the orientation of the information processing apparatus 1 is recognized using an acceleration sensor which is an exemplary motion sensor.

As illustrated in FIG. 4A, an information processing apparatus 1-1 according to the present embodiment has an acceleration sensor 19. Here, it is assumed that the acceleration sensor 19 is provided so that the direction of the side on which the display unit 14 is provided is oriented in the + direction.

In such a case, when the information processing apparatus 1-1 is put in a chest pocket of a user 2 in a manner facing outward, as illustrated in the left side of FIG. 4B, it is presumable that the direction of movement detected by the acceleration sensor 19 coincides with a person's travelling direction since a person seldom walks backward.

Therefore, when acceleration in the + direction is detected by the acceleration sensor 19 provided so that the side direction of the display unit 14 is oriented in the + direction, the recognition unit 100 recognizes that the information processing apparatus 1-1 is put in facing outward.

When, on the other hand, the information processing apparatus 1-1 is put in the chest pocket of the user 2 in a manner facing inward, as illustrated in the right side of FIG. 4B, the travelling direction of the user 2 is oriented in the direction opposite to the orientation of the acceleration sensor 19 (orientation of the sensor axis).

Therefore, when acceleration in the—direction is detected by the acceleration sensor 19 provided so that the side direction of the display unit 14 is oriented in the + direction, the recognition unit 100 recognizes that the information processing apparatus 1-1 is put in facing inward.

Accordingly, when the orientation relation between the acceleration sensor 19 mounted on the information processing apparatus 1-1 and the display unit 14 is known, the recognition unit 100 can recognize the orientation of the information processing apparatus 1, based on the acceleration detected by the acceleration sensor 19.

Although it is assumed in the recognition process described above that the information processing apparatus 1-1 is put in a pocket or the like provided at the side in the travelling direction of the user 2, it is also conceivable that the information processing apparatus 1-1 is put in another pocket such as a back pocket of the pants. Therefore, the recognition unit 100 can recognize the orientation more accurately by setting placement information with regard to whether the user 2 puts the information processing apparatus 1-1 in the front pocket or the back pocket, or attaches it to a bag.

In addition, when the information processing apparatus 1-1 is further provided with a camera, the recognition unit 100 can recognize the orientation more accurately by checking whether the motion detected by the acceleration sensor 19 coincides with the optical flow based on the image captured by the camera.

(Recognition Method Using a Camera)

Besides the aforementioned recognition method using the motion sensor, there is also conceivable a recognition method using a camera, for example.

Figure 5A:
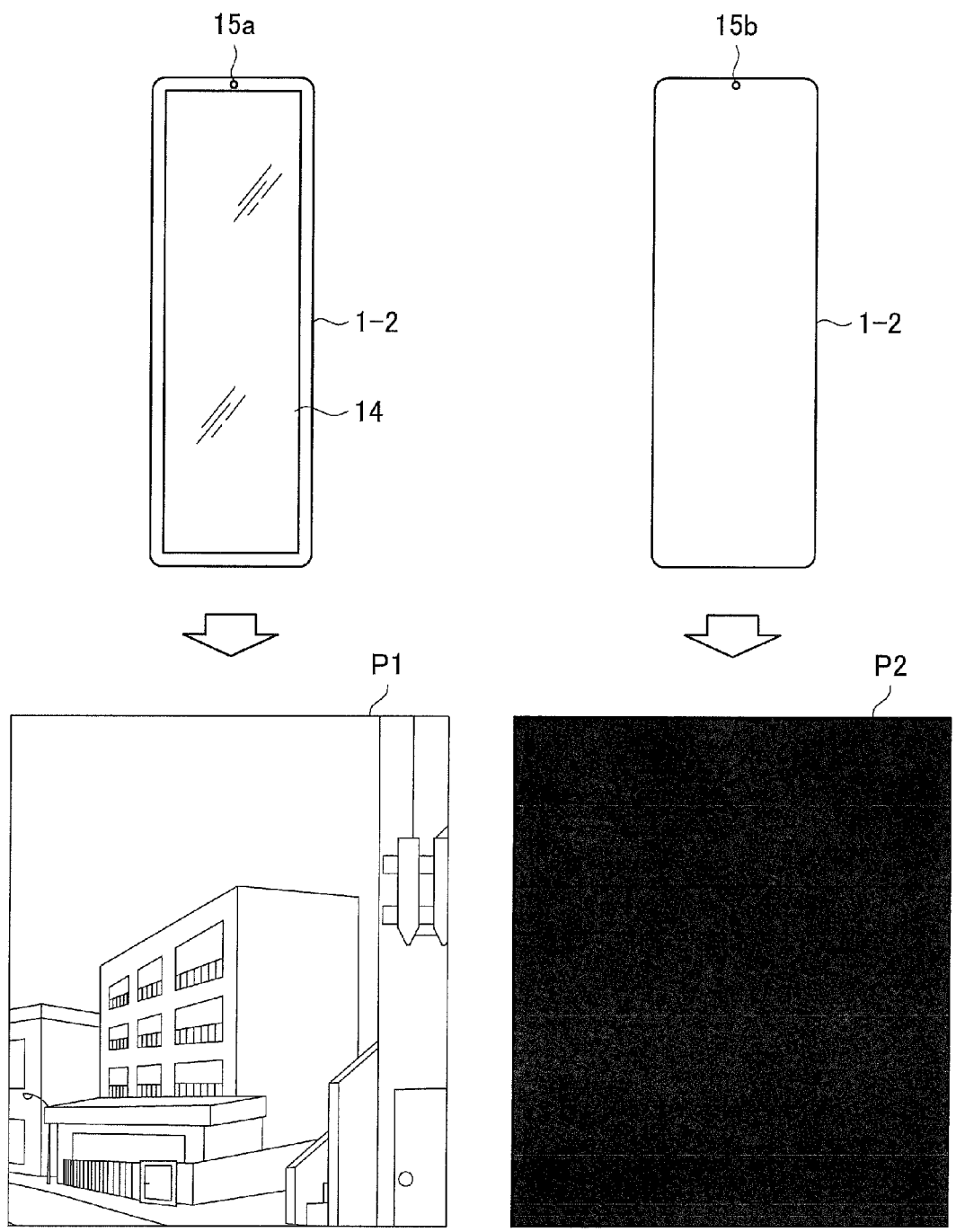
FIG. 5A is an explanatory diagram of a process of recognizing the orientation of the information processing apparatus using a camera.
Figure 5B:
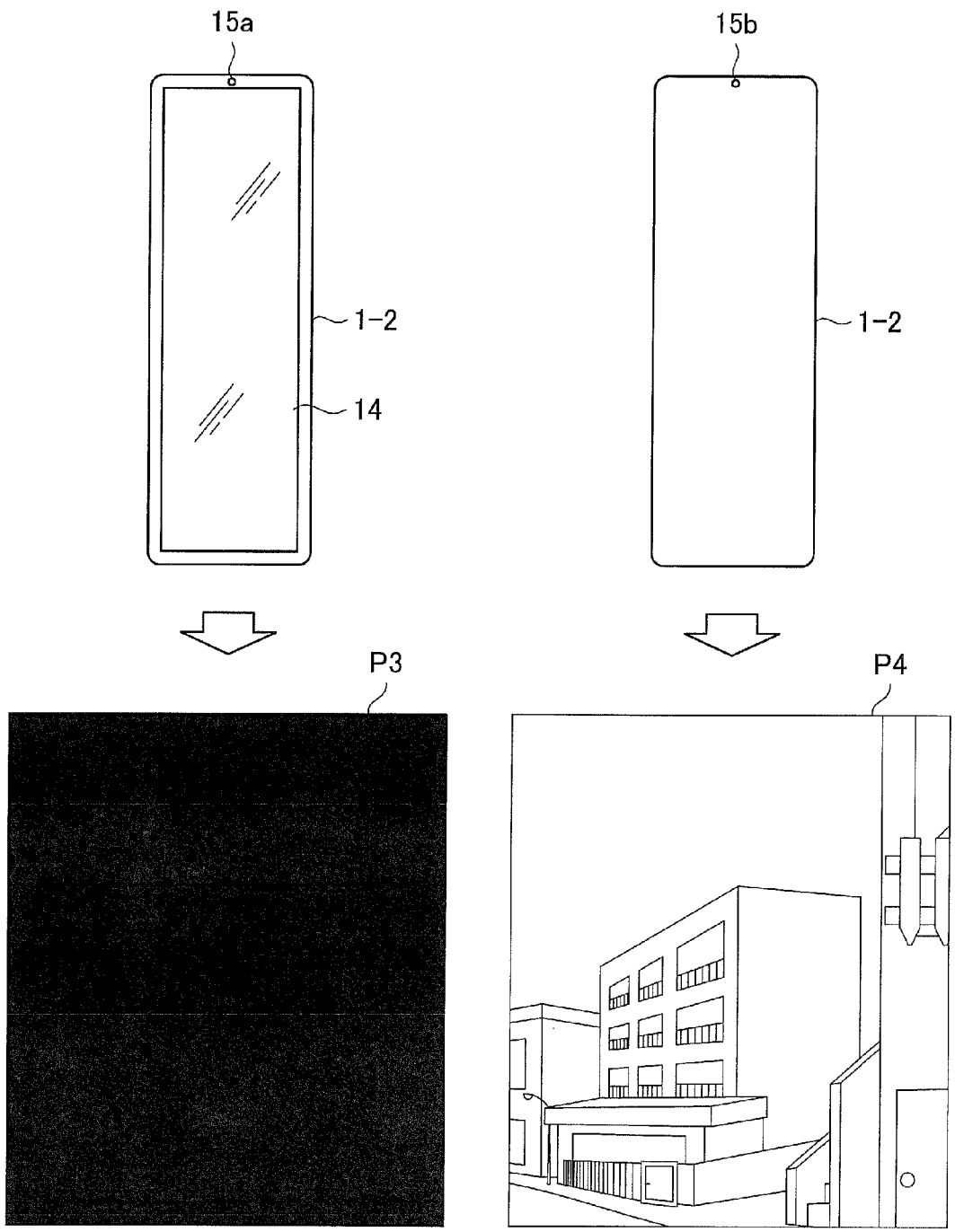
FIG. 5B is an explanatory diagram of a process of recognizing the orientation of the information processing apparatus using a camera.

FIGS. 5A and 5B are explanatory diagrams of a process of recognizing the orientation of the information processing apparatus 1 using a camera. In this example, it is assumed that two cameras 15a and 15b are mounted on the information processing apparatus 1.

The camera 15a is an in-camera provided on the side (surface) on which the display unit 14 of an information processing apparatus 1-2 according to the present embodiment and mainly used for video chat or self-shooting.

The camera 15b is a camera provided on the back side of the information processing apparatus 1-2 and mainly used for picture/video shooting.

Here, captured images P1 and P2 illustrated in FIG. 5A are respective images captured by the cameras 15a and 15b in a case where the information processing apparatus 1-2 is put in a pocket or the like in a manner facing outward, or attached to a bag or the like in a manner facing outward, with at least a portion including a part of the camera 15a being exposed.

In such a case, the captured image P1 with an outside scene as illustrated in the left bottom of FIG. 5A is captured by the camera 15a, whereas the dark captured image P2 with nothing appearing therein as illustrated in the right bottom of FIG. 5A is captured by the camera 15b. Since the recognition unit 100 knows that the image P1 captured by the camera 15a has an outside scene by analyzing the brightness or the like of respective captured images P1 and P2 via image processing, it is possible to recognize that the information processing apparatus 1-2 is facing outward.

On the other hand, captured images P3 and P4 illustrated in FIG. 5B are respective images captured by the cameras 15a and 15b in a case where the information processing apparatus 1-2 is put in a pocket or the like in a manner facing inward, or attached to a bag or the like in a manner facing inward.

In such a case, the dark captured image P3 with nothing appearing therein as illustrated in the left bottom of FIG. 5B is captured by the camera 15a, whereas the captured image P4 with an outside scene as illustrated in the right bottom of FIG. 5B is captured by the camera 15b. Since the recognition unit 100 knows that the image P4 captured by the camera 15b has an outside scene by analyzing the brightness of respective captured images P3 and P4 via image processing, it is possible to recognize that the information processing apparatus 1-2 is facing inward.

Accordingly, when the orientation relation between the cameras 15a and 15b, and the display unit 14 is known, the recognition unit 100 can recognize the orientation of the information processing apparatus 1, by analyzing the brightness or the like of the respective images captured by the cameras 15a and 15b and determining which one of the captured images has an outside scene.

Although two cameras 15a and 15b are provided at the front and the back of the information processing apparatus 1-2 in the aforementioned example, the present embodiment is not limited thereto and the orientation of the information processing apparatus 1 may be similarly recognized with a configuration having at least one camera provided at the front or the back of the information processing apparatus 1, for example.

The information processing apparatus 1 may also be provided with an infrared camera, in addition to the cameras 15a and 15b. Accordingly, it is possible to capture an image of the outside scene even during nighttime, whereby the recognition unit 100 can recognize the orientation of the information processing apparatus 1 more accurately. The information processing apparatus 1 may also be provided with an illuminance sensor, in addition to the cameras 15a and 15b. Accordingly, the recognition unit 100 can recognize the orientation of the information processing apparatus 1 based on the value of the detected illuminance, without performing image processing.

(2-2 2. Recognition of a Display Region)

Subsequently, a specific recognition process when recognizing, by the recognition unit 100, a display region in the display unit 14 which is visible from the outside will be described. When the information processing apparatus 1 is attached to a bag being carried by a user or a pocket of the user's clothes in a manner facing outward, with the display screen being exposed, as described above referring to FIG. 1, there may be conceived a new usage of the information processing apparatus 1 such as presenting information such as advertisements or the like in the region exposed to the outside. Therefore, the recognition unit 100 according to the present embodiment can avoid an incomplete state such as a part of the presented information being hidden by the pocket, by recognizing the display region in the display unit 14 which is visible from the outside.

(Recognition of a Display Region Using a Camera)

First, recognition of the display region using a camera will be described, referring to FIG. 6. FIG. 6 is an explanatory diagram of the recognition process of the display region (protruding area) of each information processing apparatus 1 when the information processing apparatus 1 is put in pockets of different depths. In this example, it is assumed that the information processing apparatus 1 has the camera 15c mounted thereon.

The camera 15c is provided, as illustrated in FIG. 6, at an approximately central position on one of the long sides of the display unit 14 at the side on which the display unit 14 of an information processing apparatus 1-3 according to the present embodiment is provided. When the relative relation between the placement of the camera 15c and the region position of the display unit 14 is known, the recognition unit 100 can recognize the display region of the display unit 14 which is visible from the outside, by analyzing the image captured by the camera 15c via image processing and determining to what extent the outside scene appears therein.

Specifically, when the information processing apparatus 1-3 is put in a shallow pocket 21a in a manner facing outward, an image P5 is captured by the camera 15c. The recognition unit 100 analyzes the captured image P5 via image processing and, with the outside scene appearing in the entire region of the captured image P5, can recognize that the entire screen of the display unit 14 is the display region which is visible from the outside.

In addition, when the information processing apparatus 1-3 is put in a pocket 21b which is deeper than the pocket 21a in a manner facing outward, an image P6 is captured by the camera 15c. The recognition unit 100 analyzes the captured image P6 via image processing and, with the outside scene appearing in a region approximately half the captured image P6, can recognize that the screen approximately half the display unit 14 is the display region which is visible from the outside.

In addition, when the information processing apparatus 1-3 is put in a pocket 21c which is further deeper than the pocket 21b in a manner facing outward, an image P7 is captured by the camera 15c. The recognition unit 100 analyzes the captured image P7 via image processing and, with no outside scene appearing in the captured image P7, can recognize that the entire screen of the display unit 14 is invisible from the outside. When the image P7 is captured, it is possible for the recognition unit 100 to distinguish the captured image P7 from the case where no outside scene is appearing due to its facing inward by recognizing that the information processing apparatus 1-3 is facing outward using a motion sensor or the like.

As described above, when the relative relation between the position of the camera 15c and the position of the display unit 14 is known, the recognition unit 100 can recognize the display region which is visible from the outside, by analyzing the brightness of the image captured by the camera 15c and determining to what extent the outside scene or the lining of a pocket or the like appears therein.

(Recognition of the Display Region Using a Touch Sensor)

Subsequently, a recognition process of the display region using a touch sensor will be described, referring to FIG. 7. FIG. 7 is an explanatory diagram of the recognition process of the display region of each information processing apparatus 1 when the information processing apparatus 1 is put in pockets of different depths. In this example, it is assumed that the information processing apparatus 1 has a touch panel 16a mounted thereon as an exemplary touch sensor.

The touch panel 16a is provided being stacked on the display unit 14 of an information processing apparatus 1-4 according to the present embodiment. In addition, the touch panel 16a is realized by a capacitance or a camera-in-cell touch panel, for example, whose region on the screen touched by a finger, an object, the lining of a pocket or the like can be captured pixel-by-pixel as a capacitance value or a camera pixel value. FIG. 7 illustrates the capacitance value detected in the case where the touch panel 16a is realized as a capacitance type. In addition, with the position of the touch panel 16a corresponding to the position of the display unit 14, the recognition unit 100 can recognize the display region of the display unit 14 which is visible from the outside, in accordance with the height of the strength along the x-axis/y axis detected by the touch panel 16a.

Since the information processing apparatus 1-4 is put in the pocket in the longitudinal direction (the direction in which the long side is vertical) in the example illustrated in FIG. 7, the recognition unit 100 can recognize the display region in accordance with the height of the strength detected in the x-axis direction of the touch panel 16a (corresponding to the long side direction). Whether or not the information processing apparatus 1-4 is placed in the longitudinal direction may be determined, for example, based on the detection result of a gyro sensor or a triaxial acceleration sensor mounted on the information processing apparatus 1.

Specifically, when the information processing apparatus 1-4 is put in the shallow pocket 21a in a manner facing outward, the strength detected in the x-axis direction of the touch panel 16a is constantly low, as illustrated in FIG. 7, and therefore the recognition unit 100 can recognize that the entire screen of the display unit 14 is the display region which is visible from the outside.

In addition, when the information processing apparatus 1-4 is put in the pocket 21b which is deeper than the pocket 21a in a manner facing outward, the strength detected in the x-axis direction of the touch panel 16a is low up to an approximate midpoint and higher than a predetermined value after the approximate midpoint, as illustrated in FIG. 7. Consequently, the recognition unit 100 can recognize that approximately half the screen of the display unit 14 is the display region which is visible from the outside.

In addition, when the information processing apparatus 1-4 is put in the pocket 21c which is further deeper than the pocket 21b in a manner facing outward, the strength detected in the x-axis direction of the touch panel 16a is constantly high, as illustrated in FIG. 7. Consequently, the recognition unit 100 can recognize that the entire screen of the display unit 14 is invisible from the outside. Here, it is possible for the recognition unit 100 to distinguish a case where the information processing apparatus 1-4 is facing inward and contacting the cloth on which the pocket is stitched and thus a high strength is constantly detected, from a case where the information processing apparatus 1-4 is put in the deep pocket 21c in a manner facing outward, by recognizing that the information processing apparatus 1-4 is facing outward using a motion sensor or the like.

Accordingly, when the display unit 14 mounted on the information processing apparatus 1-4 has the touch panel 16a, the recognition unit 100 can recognize the display region by analyzing the strength detected by the touch panel 16a. In the example illustrated in FIG. 7, although analysis is performed on the capacitance value detected when the touch panel 16a is of the capacitance type, the present embodiment is not limited thereto and the touch panel 16a may be realized as an in-cell type, for example. When the touch panel 16a is realized as a camera-in-cell type, a region contacting an object is detected and therefore the recognition unit 100 can recognize a region other than the region contacting the object, as the display region.

The recognition process by the recognition unit 100 of the present embodiment has thus been described above. Subsequently, an exemplary display of images to be displayed in the display region which has been recognized by the recognition unit 100 will be described in detail, referring to FIG. 8-FIG. 13.

<2-3. Exemplary Display>

FIG. 8 is a schematic explanatory diagram of display control in accordance with the display region of the display unit 14 which is visible from the outside. As illustrated in the left side of FIG. 8, when the information processing apparatus 1 is provided in the shallow pocket 21a and the entire screen of the display unit 14 is visible from the outside, the entire screen of the display unit 14 is recognized by the recognition unit 100 as a display region S1. In such a case, the display control unit 120 performs the usual display control, treating the entire screen as the drawing target.

When, on the other hand, a part of the display unit 14 of the information processing apparatus 1 which has been put in pockets 21d and 21e is protruding, as illustrated in the center of FIG. 8 and the right side of FIG. 8, such a protruding region is recognized by the recognition unit 100 as display region S2 or S3. In such a case, with only the display region S2 or S3 being the drawing target, the display control unit 120 can suppress power consumption or degradation of pixels due to redrawing of the screen by turning OFF the display in any region other than the display region S2 or S3. In addition, it is possible to prevent the information processing apparatus 1 from malfunctioning due to contact with the lining of the pocket or the like, by rejecting touch operations from any region other than the display region S2 or S3,.

Generation and layout of images (presentation information including charts, texts, still images and movies) to be displayed in the aforementioned display regions S1 to S3 will be described specifically, referring to FIG. 9-FIG 10.

(2-3-1. Enlarged/Reduced Display)

Figure 9:
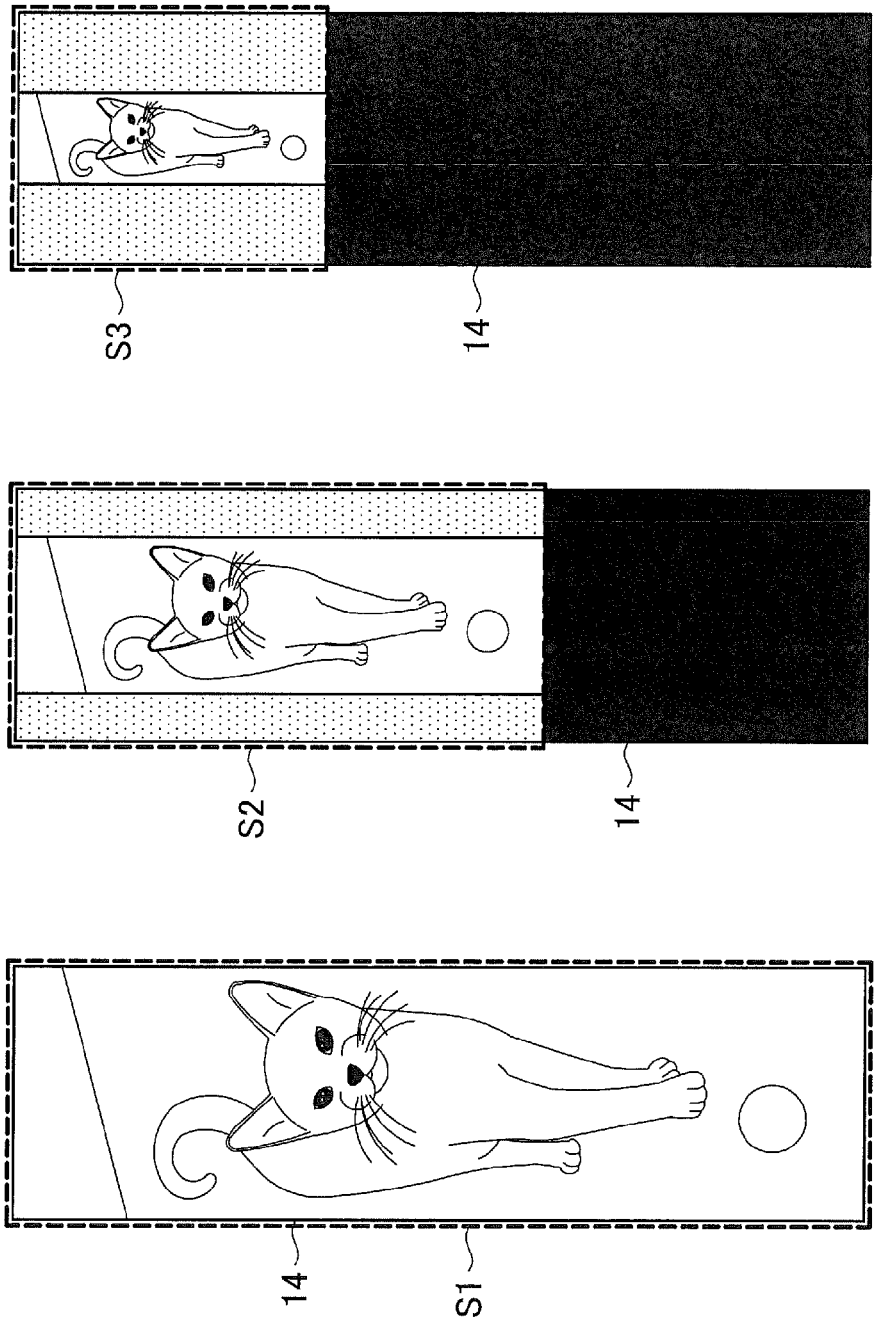
FIG. 9 is an explanatory diagram of a process of displaying an enlarged/reduced image in accordance with the display region.

FIG. 9 is an explanatory diagram of a process of displaying an image in an enlarged/reduced manner, in accordance with the display regions S1 to S3.

When displaying an image in the display region S1, which is a region of the entire screen of the display unit 14, as illustrated in the left side of FIG. 9, the image generation unit 110 generates an image as usual without particularly performing the image enlarging/reducing process. The display control unit 120 then performs control to display the generated image in the display region S1.

When, on the other hand, the region of a part of the display unit 14 is the display region S2 or S3, as illustrated in the center and the right side of FIG. 9, the image generation unit 110 generates an enlarged/reduced image in accordance with the display region S2 or S3. The display control unit 120 then performs control to display the generated image in the display region S1. Accordingly, the entire range of the image is displayed in the display region of the display unit 14 which is visible from the outside, and therefore it is possible to avoid incomplete information presentation such that a part of the displayed image is hidden by a pocket or the like.

(2-3-2. Prioritized Display)

Although display control is performed in the aforementioned example of enlarged/reduced display so that the entire range of the image is included in the display region S, regardless of the size (area) of the display region S which is visible from the outside, there may occur a case where the reduced image is difficult to be seen, depending on the size of the display region S. Therefore, the image generation unit 110 according to the present embodiment allows efficient information presentation even in a small display region S, by re-laying out and generating the image in accordance with the priority order (priority) of the information to be presented in the display region S. Specific descriptions will be provided below, referring to FIG. 10.

Figure 10:
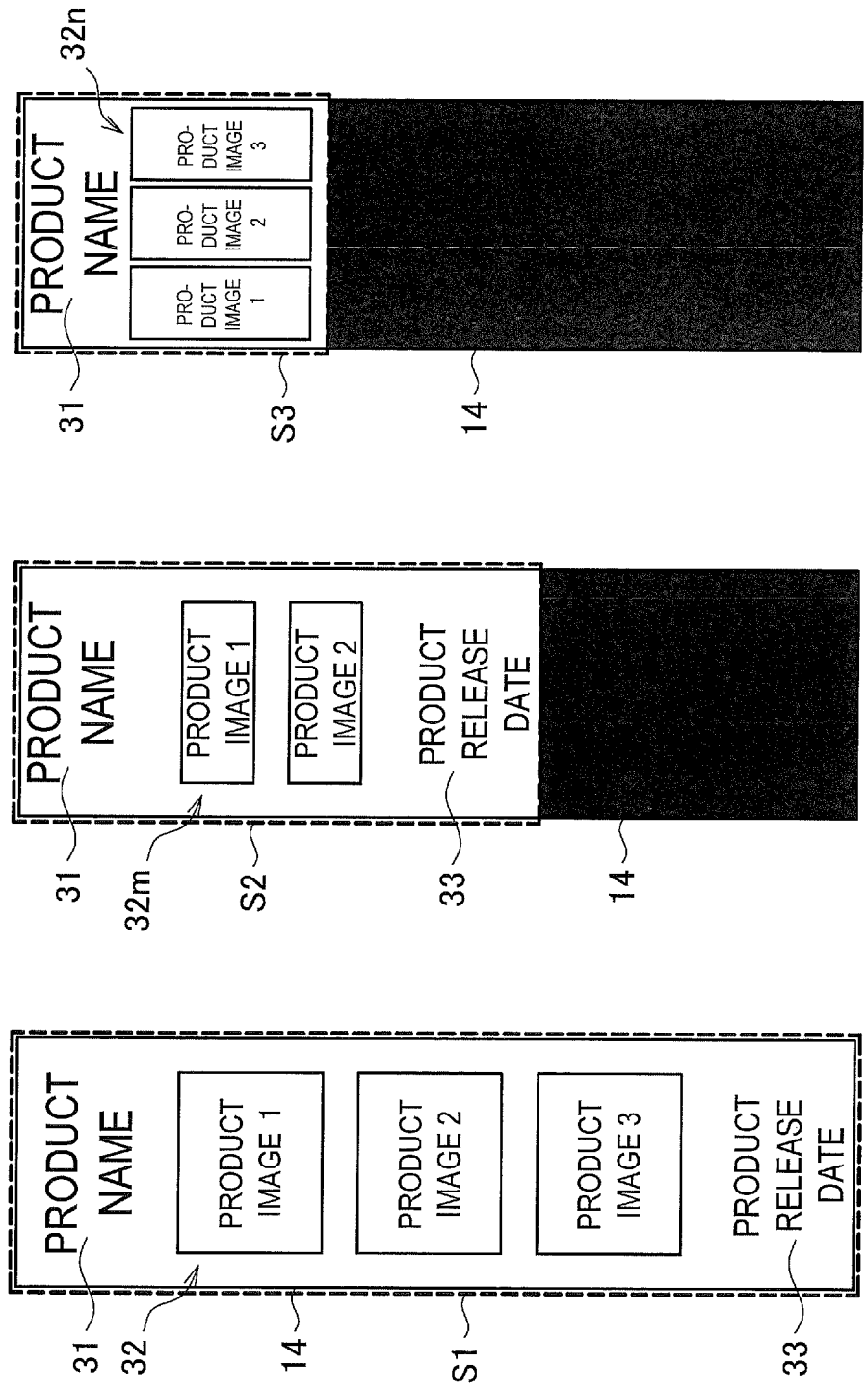
FIG. 10 is an explanatory diagram of re-laying out the image in accordance with a priority order of information.

FIG. 10 is an explanatory diagram of a case of re-laying out the image in accordance with the priority order of information.

When, displaying an image in the display region S1, which is a region of the entire screen of the display unit 14, as illustrated in the left side of FIG. 10, the image generation unit 110 generates an image including all of presentation information 31 (e.g., product name information), presentation information 32 (e.g., product image information), and presentation information 33 (e.g., release date information) without particularly re-laying out the image. The display control unit 120 then performs control to display the generated image in the display region S1.

When, on the other hand, a region approximately two-thirds of the display unit 14 is the display region S2, as illustrated in the center of FIG. 10, the image generation unit 110 re-lays out and generates the image in accordance with the priority order (priority) of respective pieces of the presentation information. Specifically, for example, when the presentation information 32 includes a plurality of pieces of information such as product image 1, product image 2, and product image 3, for example, the image generation unit 110 generates therefrom presentation information 32m including only the information with a high priority such as the product image 1 and the product image 2, for example, with the product image 3 being omitted. Furthermore, the image generation unit 110 can realize a layout that allows presentation of the other presentation information 31 and 33 without reducing them, by reducing the product image 1 and the product image 2 included in the presentation information 32m to decrease the area necessary for displaying the presentation information 32m. The display control unit 120 then performs control to display the generated image in the display region S2.

In addition, the area of the display region S3 in the example illustrated in the right side of FIG. 10 is smaller than the display region S2, in which case, the image generation unit 110 generates an image including the presentation information 31 and 32 having a high priority among the plurality of pieces of presentation information 31, 32 and 33. Furthermore, the image generation unit 110 reduces and rearranges the product images 1 to 3 included in the presentation information 32, and generates an image including presentation information 32n with a decreased area necessary for display, as illustrated in the right side of FIG. 10. The display control unit 120 then performs control to display the generated image in the display region S3.

Accordingly, the image generation unit 110 according to the present embodiment can perform effective information presentation, by generating an image having aggregated therein a plurality of pieces of information high in the priority order among the information to be presented in the display region S2 or S3 of the display unit 14 which is visible from the outside. In addition, the image generation unit 110 can also perform effective information presentation by generating an image arranged so that information high in the priority order is located at the center of the display region.

Generation of images to be displayed in the display region has thus been described in detail above. Next, an exemplary display control in accordance with applications will be described, referring to a plurality of specific examples. This is because the content and purpose of the displayed image differs depending on the type of application and thus display control to perform information presentation more effectively is different.

(2-3-3. Exemplary Display Depending on the Application)

First, an exemplary display depending on an application which displays an agent such as a character will be described, referring to FIG. 11.

When the information processing apparatus 1 is set up on a cradle 4 or the like so that the entire region of the display unit 14 is visible from the outside, as illustrated in the left side of FIG. 11, the entire region of the display unit 14 is recognized as the display region S1. In such a case, the image generation unit 110 generates an image in which the entire body of the agent appears in the display region S1. The generated image is displayed in the display region S1 by the display control unit 120.

When, on the other hand, the information processing apparatus 1 is put in the pocket 21 or the like so that only a part of the region of the display unit 14 is visible from the outside, as illustrated in the right side of FIG. 11, that part of the region of the display unit 14 is recognized as the display region S. In such a case, only the part of the display region S exposing from the pocket 21 is visible from the outside and therefore the image generation unit 110 can perform effective information presentation by using only the display region S as the drawing target. Specifically, the image generation unit 110 generates an image in which the upper body of the agent appears and displays the image in the display region S2 using the display control unit 120. In addition, the display control unit 120 can prevent wasting power consumption by turning OFF the display in any region other than the display region S. Furthermore, it is possible to prevent the information processing apparatus 1 from malfunctioning due to contact with the lining of the pocket 21 or the like, by rejecting touch operations from any region other than the display region S.

Subsequently, an exemplary display in accordance with fashion application which displays the user's favorite brand as a fashion item will be described, referring to FIG. 12.

Figure 12:
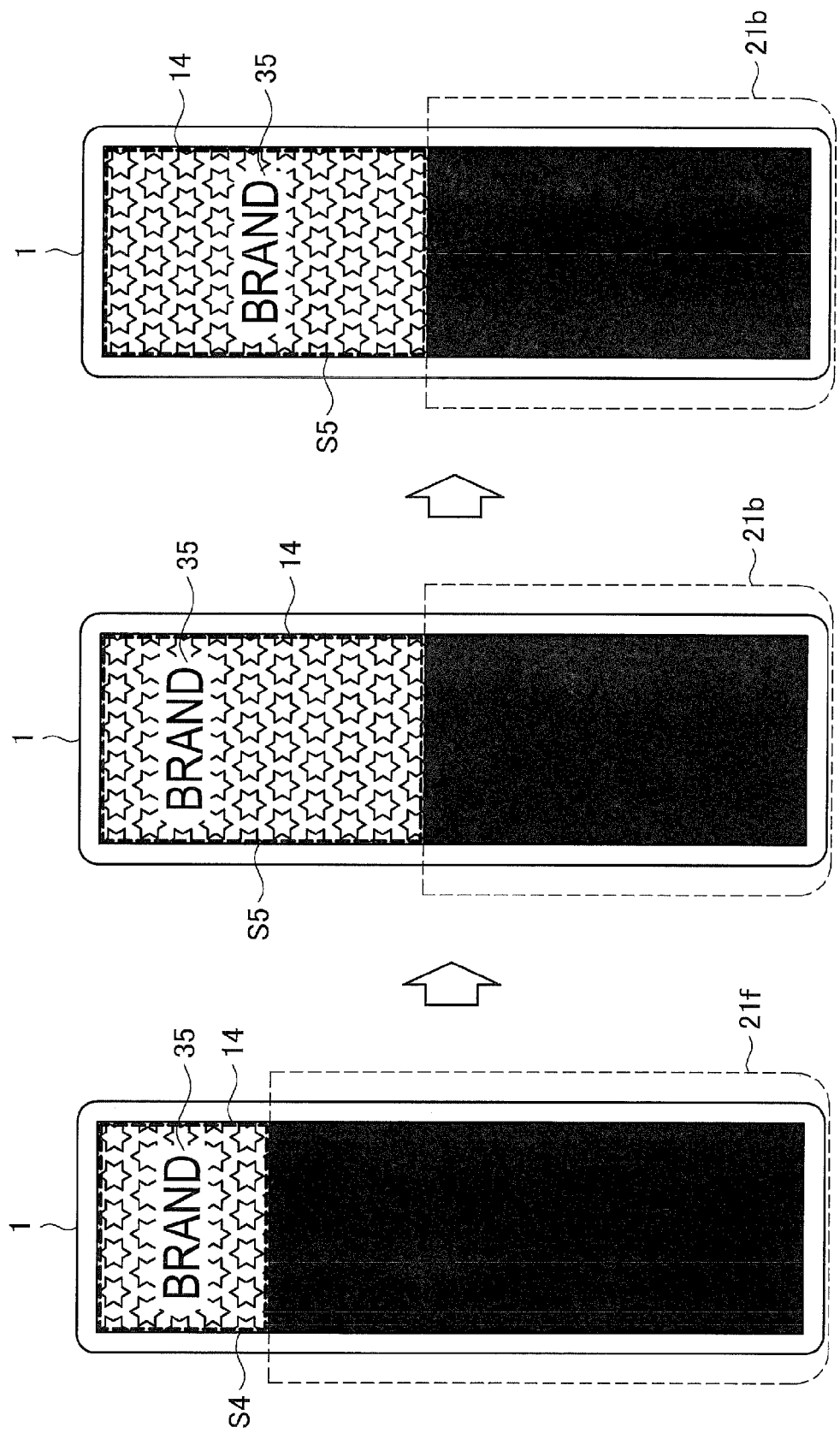
FIG. 12 is an explanatory diagram of an exemplary display according to a fashion application which displays a user-favorite brand as a fashion item.

In a state illustrated in the left side of FIG. 12, a logo 35 is displayed at the center of the display region S4 of the display unit 14 which is protruding from the pocket 21f and visible from the outside, with the surroundings being wallpaper.

When, in the above display state, the information processing apparatus 1 is put in the pocket 21b which is shallower than the pocket 21f, as illustrated in the center of FIG. 12, the display region S5 of the display unit 14 which is visible from the outside becomes wider than the display region S4. In such a case, when the image generation unit 110 generates an image with the wallpaper being simply expanded, the image has the logo 35 shifted to the upper side, as illustrated in the center of FIG. 12.

Therefore, the image generation unit 110 can prevent off-balance by re-laying out the image in accordance with the display region S5 to generate an image arranged so that the logo 35 is located at the center of the display region S5 of the display unit 14, as illustrated in the right side of FIG. 12. In other words, in the case of fashion application, the image generation unit 110 performs effective information presentation by generating an image arranged so that information high in the priority order (logo 35, in this case) is located at the center of the display region.

Next, an exemplary display depending on an application which displays an advertisement to the people around will be described, referring to FIG. 13.

Figure 13:
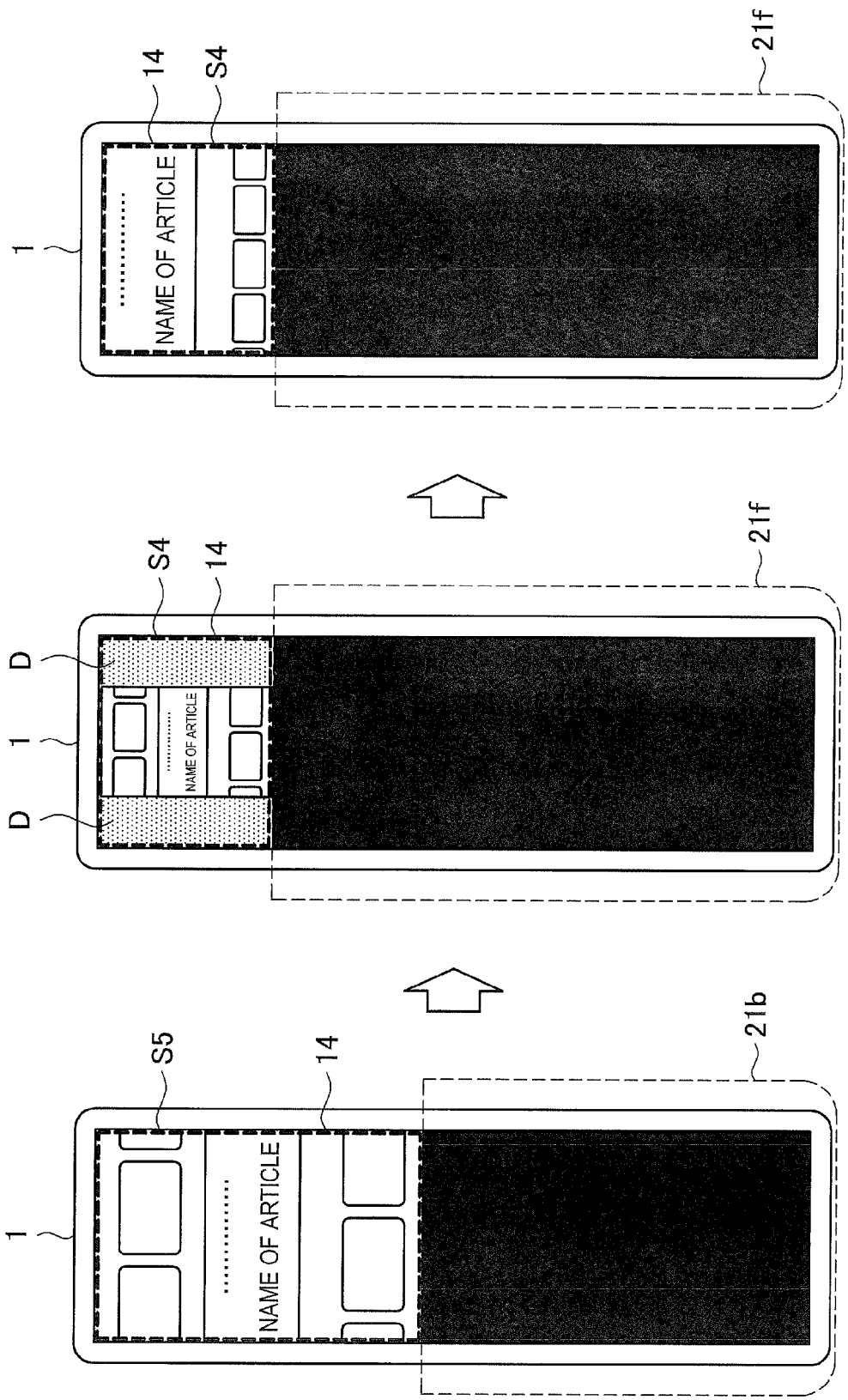
FIG. 13 is an explanatory diagram of an exemplary display according to an application which displays an advertisement aimed at people around.

When, as illustrated in the left side of FIG. 13, the information processing apparatus 1 is protruding from the pocket 21b by approximately half its length and approximately half the display unit 14 is recognized as the display region S5 which is visible from the outside, the image generation unit 110 can perform presentation of an advertisement in a sufficient area approximately half the display unit 14.

When, however, the information processing apparatus 1 is put in the pocket 21f which is deeper than the pocket 21b, approximately three-quarters of the display unit 14 is hidden by the pocket 21f, as illustrated in the center of FIG. 13, whereby the display region S4 of the display unit 14 which is visible from the outside becomes smaller than the display region S5. In such a case, when the image generation unit 110 generates a reduced image, the advertisement image becomes small and its content becomes hard to see, and also a blank D is generated in the display region S4, as illustrated in the center of FIG. 13, which reduces efficiency of information.

Therefore, as illustrated in the right side of FIG. 13, the image generation unit 110 can perform information presentation utilizing the small area sufficiently, by re-laying out the image in accordance with the display region S4 and performing an adjustment such as enlarging the name of article preferentially in the advertisement, and displaying only a part of the article image (article image on the lower row in the example illustrated in the right side of FIG. 13). In other words, in the case of advertisement application, the image generation unit 110 performs effective information presentation by generating an image having aggregated therein a plurality of pieces of information high in the priority order (name of article and article image, in this case).

In addition, when an advertisement is presented in the display region S using such an advertisement application, rewards such as amenities or points may be provided to the person who presented the advertisement depending on the area of the display region and presentation time of the advertisement.

<<3. Operation Processing>>

Figure 14:
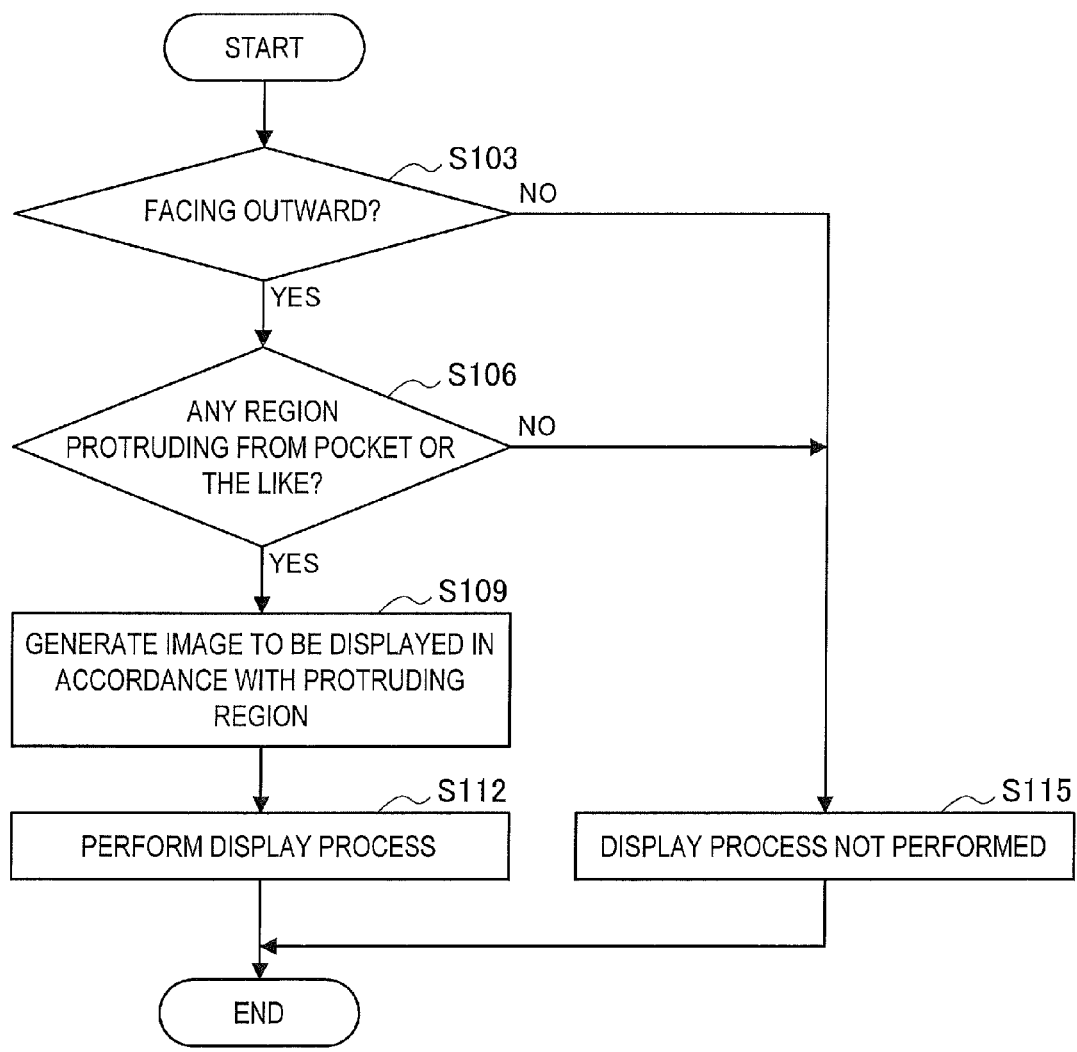
FIG. 14 is a flow chart illustrating a display control process on the display region, which is visible from the outside, in the display unit of the information processing apparatus.

Subsequently, operation processing of the information processing apparatus 1 according to the present embodiment will be described, referring to FIG. 14. FIG. 14 is a flow chart illustrating a display control process on the display region, which is visible from the outside, in the display unit 14 in the information processing apparatus 1.

As illustrated in FIG. 14, the recognition unit 100 of the information processing apparatus 1 first recognizes at step S103 the orientation of the information processing apparatus 1, and determines whether or not the side on which the display unit 14 is provided faces the outside, in other words, facing outward.

Subsequently, when it is recognized that the information processing apparatus 1 is facing outward (Yes in S103), the recognition unit 100 recognizes, at step S106, a region protruding from a pocket or the like, i.e., a display region which is visible from the outside.

Next, when a protruding region (display region) is recognized (Yes in S106), the image generation unit 110 generates, at step S109, an image to be displayed in accordance with the display region.

Subsequently, at step S112, the display control unit 120 performs control to display, in the display region, the image generated by the image generation unit 110.

In addition, when it is recognized at S103 that the information processing apparatus 1 is facing inward (No in S103), or when it is determined at S106 that there is no protruding region (No in S106), the process is terminated at step S115 without performing the display process.

As described above, the operation processing of the information processing apparatus 1 according to the present embodiment has been described specifically. The aforementioned operation processing may be performed successively, or may be performed when an acceleration sensor or a gyro sensor mounted on the information processing apparatus 1 detects that the information processing apparatus 1 is moved.

<<4. Hardware Configuration>>

Figure 15:
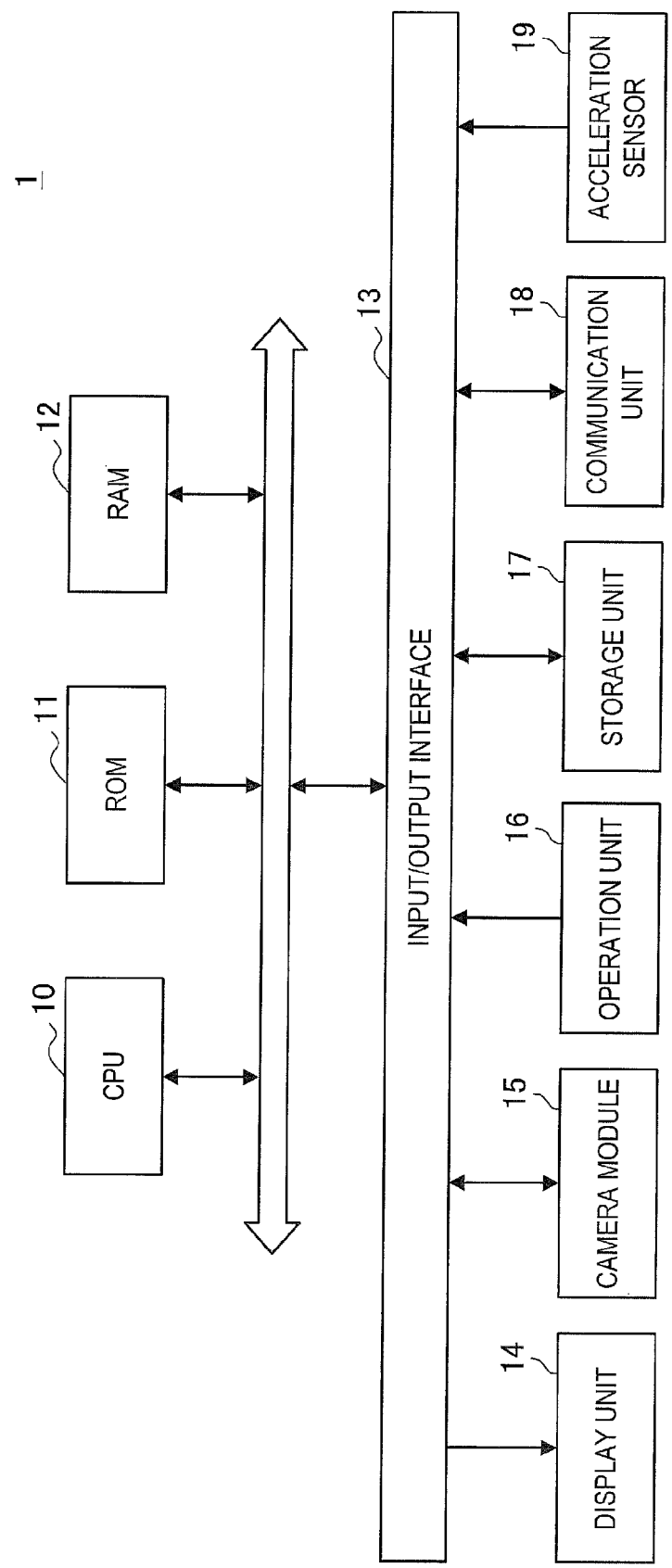
FIG. 15 is a block diagram illustrating an exemplary hardware configuration of the information processing apparatus according to the present embodiment.

Next, a hardware configuration of the information processing apparatus 1 according to the present embodiment will be described, referring to FIG. 15. FIG. 15 is a block diagram illustrating an exemplary hardware configuration of the information processing apparatus 1 according to the present embodiment. As illustrated in FIG. 15, the information processing apparatus 1 according to the present embodiment has a CPU (Central Processing Unit) 10, a ROM (Read Only Memory) 11, a RAM (Random Access Memory) 12, an input/output interface 13, the display unit 14, a camera module 15, an operation unit 16, a storage unit 17, a communication unit 18, and the acceleration sensor 19.

The CPU 10 performs various processes using a program stored in the ROM 11 or a program loaded from the storage unit 17 to the RAM 12. Specifically, the CPU 10 according to the present embodiment performs the process of each function block illustrated in FIG. 2. The RAM 12 has stored therein, as appropriate, data which is necessary for the CPU 10 to perform the various processes. In addition, the CPU 10, the ROM 11, and the RAM 12 are connected to each other via a bus. The input/output interface 13 is also connected to the bus.

To the input/output interface 13, the display unit 14, the camera module 15, the operation unit 16, the storage unit 17, the communication unit 18, and the acceleration sensor 19 are connected. The input/output interface 13 performs mediation between the data input to and output from each of the connected components, and the data input to and output from the CPU 10, the ROM 11, and the RAM 12 via a bus. Since the components connected to the input/output interface 13 illustrated in FIG. 15 are exemplary, there may be a configuration having either the camera module 15 or the acceleration sensor 19, for example, or a configuration having neither of them.

According to the control of the CPU 10, the display unit 14 displays (reproduces) various contents, menu screens, operation screens, or the like. In addition, the display unit 14 is realized, for example, by an LCD (Liquid Crystal Display), an OLED (Organic Light-Emitting Diode), or the like. In addition, the display unit 14 according to the present embodiment displays, in the display region recognized by the recognition unit 100, the image generated by the image generation unit 110, according to the control of the display control unit 120, which is one of the functions of the CPU 10.

The camera module 15 (imaging unit) includes an imaging optical system including an imaging lens, an imaging element, and an image signal processing unit. The imaging element is realized, for example, by a CCD (Charge Coupled Device) imager, or a CMOS (Complementary Metal Oxide Semiconductor) imager. The image signal processing unit is capable of performing noise removal, gradation correction, color correction, distortion correction, blurring correction, image compression/expansion, and the like.

The operation unit 16 has a function of receiving the user's operation input. Specifically, the operation unit 16 may be realized, for example, by a power switch or various operation buttons which are physically provided, or may be a touch sensor (capacitance type, camera-in-cell type, etc.) which is integrated with the display unit 14 and capable of detecting positions.

The storage unit 17 has a function of storing various contents such as picture images, video movies, text data, chart data, and moreover, information used in various applications (advertisement images, logo images of fashion brand).

The communication unit 18, which is connected to an external device in a wired/wireless manner, has a function of transmitting and receiving data. For example, the communication unit 18 is connected to a wireless AP (access point) using a wireless LAN, infrared, Wi-Fi (registered trademark) or the like, and can be connected to a network via the wireless AP. The communication unit 18 can thus obtain, from a predetermined server on a network, data of the advertisement images, and programs included in the software for performing a series of processes according to the present embodiment. Accordingly, the data obtained from the predetermined server on the network is stored in the storage unit 17.

The acceleration sensor 19 is an exemplary motion sensor for detecting the motion of the information processing apparatus 1. As an exemplary motion sensor, a gyro sensor may be provided, in addition to the acceleration sensor 19.

<<5. Conclusion>>

As has been described above, the information processing apparatus 1 according to embodiments of the present disclosure is capable of presenting information more effectively, by recognizing the display region of the display unit 14 which is visible from the outside, and generating an image to be displayed in accordance with the display region.

In addition, electric power consumption and deterioration of pixels due to screen rewriting can be suppressed by turning OFF the display in any region other than the display region (region of the display unit 14 which is not visible from the outside).

In addition, malfunction can be prevented by rejecting touch events from any region other than the display region (region of the display unit 14 which is not visible from the outside).

In addition, an incomplete presentation state such that a part of the presentation information is hidden by a pocket or the like can be avoided, by newly generating and displaying the image to be displayed in the display region which is visible from the outside.

In addition, efficient information presentation even in a small display region can be performed, by re-laying out in accordance with the priority of information.

It should be understood that those having common knowledge in the technical field of the present disclosure may obviously conceive various modifications or alterations within a category of technical ideas described within the scope of the appended claims, and they naturally belong to the technical scope of the present disclosure.

For example, a computer program can be created which causes the hardware built in the information processing apparatus 1, such as the CPU 10, the ROM 11, the RAM 12 and the like, to exhibit the function of the CPU 10 described referring to FIG. 2. In addition, there is also provided a non-transitory computer-readable storage medium having the computer program stored therein.

In addition, the steps in the process of the information processing apparatus 1 of the present specification not necessarily have to be processed chronologically in the order disclosed in the accompanying flow chart. For example, the steps in the process of the information processing apparatus 1 may be processed in a different order from the order described in the flow chart, or may be processed in parallel. Specifically, for example, steps S103 and S106 illustrated in FIG. 14 may be processed in parallel. In addition, processing of step S103 illustrated in FIG. 14 may be omitted.

In addition, the functional configuration described referring to FIG. 2 may be realized at a cloud provider side. Specifically, it is realized by a display control system including the information processing apparatus 1 and a server (not illustrated). The server obtains, from the information processing apparatus 1, information for recognizing the orientation of the information processing apparatus 1 and a display region visible from the outside (captured image, detection result by the acceleration sensor 19, or detection result by the touch panel 16a), and recognizes the orientation of the information processing apparatus 1 and the display region (recognition unit). Subsequently, the server generates an image to be displayed in accordance with the display region (image generation unit). Next, the server transmits the generated image to the information processing apparatus 1, and performs control to display it in the recognized display region in the display unit 14 of the information processing apparatus 1 (display control unit).

Additionally, the present technology may also be configured as below:

(1) A display control device including:

a recognition unit configured to recognize a display region in a display unit which is visible from outside;

an image generation unit configured to generate an image to be displayed in accordance with the display region recognized by the recognition unit; and a display control unit configured to control the display unit to display, on the display region, the image generated by the image generation unit.

(2) The display control device according to (1), further including:

an imaging unit, wherein the recognition unit recognizes the display region in the display unit which is visible from outside, in accordance with an image captured by the imaging unit.

(3) The display control device according to (2), wherein the imaging unit is provided on a first side on which the display unit is provided, and on a second side opposite to the first side.

(4) The display control device according to any one of (1) to (3), wherein the display control unit performs control to display the image generated by the image generation unit only in the display region.

(5) The display control device according to any one of (1) to (4), wherein a touch sensor is stacked on the display unit.

(6) The display control device according to any one of (1) to (5)

wherein the image generation unit performs a process of enlarging or reducing the image to be displayed so as to fit a size of the display region recognized by the recognition unit.

(7) The display control device according to any one of (1) to (6), wherein the image generation unit generates an image in accordance with a priority order of information among the images to be displayed so as to fit a size of the display region recognized by the recognition unit.

(8) The display control device according to (7), wherein the image generation unit generates an image arranged so that information high in the priority order is located at a center of the display region.

(9) The display control device according to (7), wherein the image generation unit generates an image in which a plurality of pieces of information high in the priority order is aggregated.

(10) A non-transitory computer-readable storage medium having a program stored therein, the program causing a computer to function as:

a recognition unit configured to recognize a display region in a display unit which is visible from outside;

an image generation unit configured to generate an image to be displayed in accordance with the display region recognized by the recognition unit; and a display control unit configured to control the display unit to display, on the display region, the image generated by the image generation unit.

What is claimed is:

1. A display control device comprising:
a CPU (Central Processing Unit) configured to:
acquire a first image;
recognize a display region in a display unit based on the acquired first image;
generate a second image to be displayed in accordance with the recognized display region; and
control the display unit to display, on the display region, the generated second image,
wherein the second image is generated in accordance with a priority order of information among a plurality of images to be displayed so as to fit a size of the recognized display region.

2. The display control device according to claim 1, wherein an imaging unit is provided on a first side, on which the display unit is provided, to acquire the first image, and another imaging unit is provided on a second side opposite to the first side.

3. The display control device according to claim 1, wherein the CPU is further configured to perform control to display the generated second image unit only in the display region.

4. The display control device according to claim 1, wherein a touch sensor is stacked on the display unit.

5. The display control device according to claim 1, wherein the CPU is further configured to perform a process of enlarging or reducing the second image to be displayed so as to fit a size of the recognized display region.

6. The display control device according to claim 1, wherein the CPU is further configured to generate an image arranged so that information high in the priority order is located at a center of the display region.

7. The display control device according to claim 1, wherein the CPU is further configured to generate an image in which a plurality of pieces of information high in the priority order is aggregated.

8. A non-transitory computer-readable storage medium having stored thereon, a set of computer-readable instructions that when executed by a computer causes the computer to perform steps comprising:
acquiring a first image;
recognizing a display region in a display unit based on the acquired first image;
generating a second image to be displayed in accordance with the recognized display region; and
controlling the display unit to display, on the display region, the generated second image,
wherein the second image is generated in accordance with a priority order of information among a plurality of images to be displayed so as to fit a size of the recognized display region.

* * * * *